(12) United States Patent
Kiiski et al.

(10) Patent No.: US 8,798,680 B2
(45) Date of Patent: Aug. 5, 2014

(54) WIRELESS CELLULAR NETWORK USING ADAPTIVE BEAMFORMING WITH DIFFERENT COVERAGE FOR CONTROL AND DATA CHANNELS

(75) Inventors: Matti Tapani Kiiski, Oulunsalo (FI); Klaus Ingemann Pedersen, Aalborg (DK); Ulrich Rehfuess, München (DE); Sabine Roessel, München (DE)

(73) Assignee: Nokia Siemens Networks Oy, Espoo (FI)

( * ) Notice: Subject to any disclaimer, the term of this patent is extended or adjusted under 35 U.S.C. 154(b) by 629 days.

(21) Appl. No.: 13/122,588

(22) PCT Filed: Oct. 5, 2009

(86) PCT No.: PCT/EP2009/062893
§ 371 (c)(1),
(2), (4) Date: May 23, 2011

(87) PCT Pub. No.: WO2010/040709
PCT Pub. Date: Apr. 15, 2010

(65) Prior Publication Data
US 2011/0223922 A1    Sep. 15, 2011

(30) Foreign Application Priority Data

Oct. 7, 2008   (EP) .................................... 08105507

(51) Int. Cl.
| H04M 1/00 | (2006.01) |
| H04W 84/08 | (2009.01) |
| H04W 28/04 | (2009.01) |
| H04W 16/28 | (2009.01) |
| H04W 24/00 | (2009.01) |
| H04B 1/10 | (2006.01) |

(52) U.S. Cl.
CPC .............. *H04W 84/08* (2013.01); *H04W 28/04* (2013.01); *H04W 16/28* (2013.01); *H04W 24/00* (2013.01); *H04B 1/1027* (2013.01)
USPC ....... 455/562.1; 455/509; 455/501; 455/452.1

(58) Field of Classification Search
CPC ..... H04W 84/08; H04W 28/04; H04W 16/28; H04W 24/00; H04B 1/1027
USPC ........... 455/561, 562.1, 446, 509, 501, 452.1, 455/452.2, 450, 422.1, 451, 507, 63.1; 370/334, 310, 328, 329, 341, 431, 468, 370/465, 464
See application file for complete search history.

(56) References Cited

U.S. PATENT DOCUMENTS

| 7,715,877 | B2 * | 5/2010 | Nakao ........................ 455/562.1 |
| 7,940,723 | B2 * | 5/2011 | Ahmadi ........................ 370/329 |

(Continued)

FOREIGN PATENT DOCUMENTS

| EP | 1 339 176 A1 | 8/2003 |
| EP | 1 865 626 A1 | 12/2007 |
| GB | 2 317 786 A | 4/1998 |

*Primary Examiner* — Ajit Patel
(74) *Attorney, Agent, or Firm* — Harrington & Smith

(57) ABSTRACT

A method and a device for data processing in a wireless communication system, in particular in a cellular system, are suggested, wherein an N-to-M control-to-data sectorization is provided to at least one mobile terminal, and wherein N corresponds to a number of control sectors and M corresponds to a number of data sectors. Furthermore, a mobile terminal for such an approach as well as a communication system comprising said device are provided.

18 Claims, 4 Drawing Sheets

(56) References Cited

U.S. PATENT DOCUMENTS

| | | |
|---|---|---|
| 2003/0162551 A1* | 8/2003 | Atarashi et al. ............... 455/456 |
| 2004/0014429 A1* | 1/2004 | Guo ................................ 455/73 |
| 2004/0063468 A1* | 4/2004 | Frank ............................ 455/561 |
| 2005/0181832 A1* | 8/2005 | Ishii et al. ................... 455/562.1 |
| 2005/0266799 A1* | 12/2005 | Hara et al. ................... 455/63.4 |
| 2007/0230328 A1* | 10/2007 | Saitou ............................ 370/210 |
| 2007/0243831 A1* | 10/2007 | Seki ................................ 455/69 |
| 2010/0151873 A1* | 6/2010 | Gorokhov et al. ......... 455/452.1 |
| 2013/0242755 A1* | 9/2013 | Seki .............................. 370/242 |

* cited by examiner

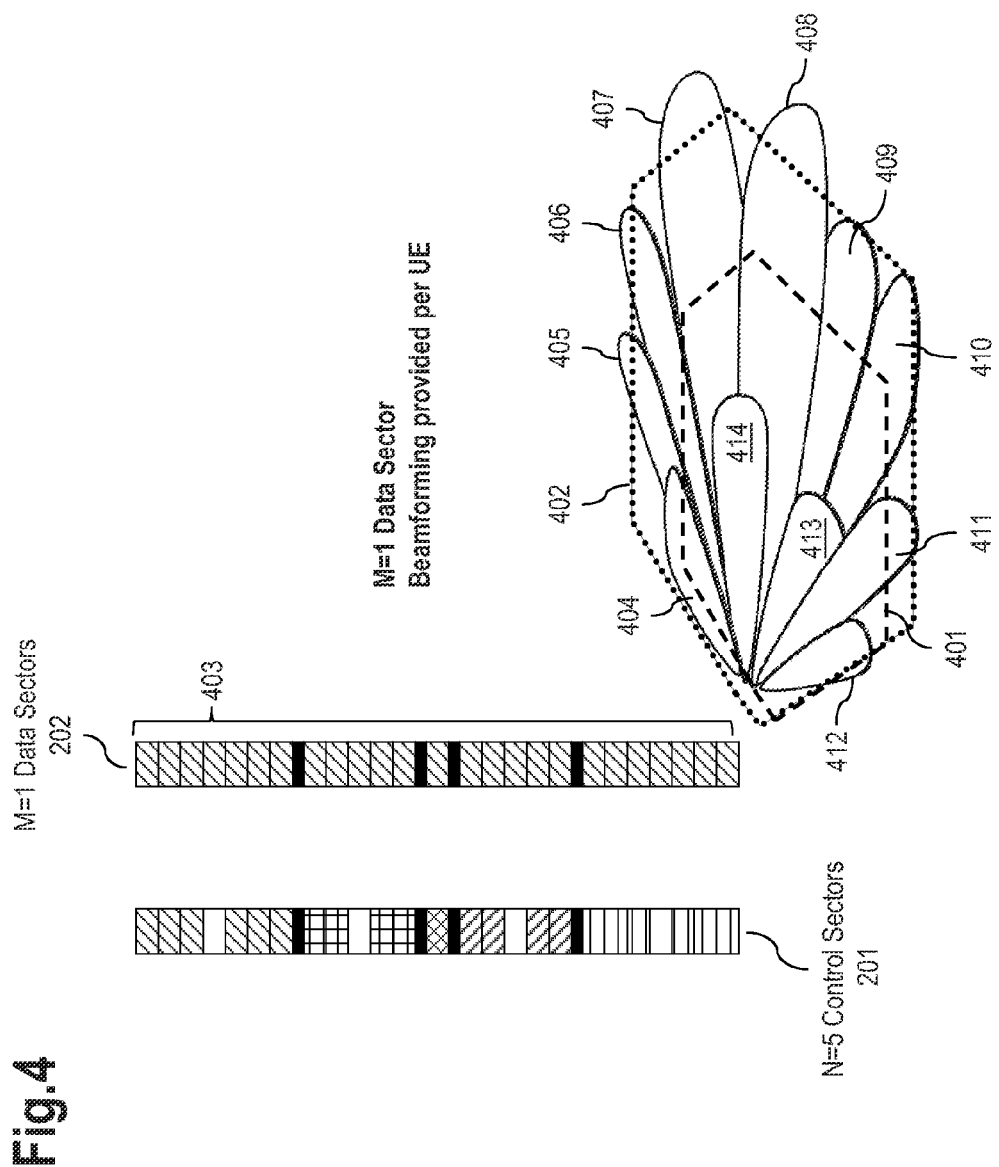

WIRELESS CELLULAR NETWORK USING ADAPTIVE BEAMFORMING WITH DIFFERENT COVERAGE FOR CONTROL AND DATA CHANNELS

TECHNICAL FIELD

The invention relates to a method and to a device for data processing in a wireless communication system, to a mobile terminal and to a communication system.

BACKGROUND

The typical macro network architecture for a broadband wireless access system including but not limited to LTE, WiMAX, and W-CDMA/HSPA assumes congruent coverage both of control channels and of data channels. The macro network is built from base stations typically serving three cells and each cell is covered by the control and by the data channels for the assigned carrier.

Referring to the base station transmit side, control channels encompass the broadcast channel with control information relevant for all user equipments (UEs) in the cell as well as with signaling channels also containing UE-specific control information spread over the full carrier bandwidth or the full CDMA code spectrum. Both types of channels need to be received by the UEs in the coverage area of the cell. In contrast, there is no such need for data channels containing UE-specific data to be received in the complete coverage area of the cell as long as each and every UE in the cell receives its UE-specific information.

Referring to the receiving side of a base station, according considerations may apply. For example, a random access channel must be received by the base station from all UEs of the cell, whereas only a portion of the uplink data channel needs to be available to a specific UE.

SUMMARY

Fixed or adaptive beamforming is a method to enhance a signal-to-noise-and-interference-ratio (SNIR) of the UEs such that either UEs' data rates can be increased or the (cell) coverage can be extended. Such coverage extension may apply in environments reaching a high degree of cost-efficiency with a least possible number of base stations deployed.

However, broadband wireless access standards, which do not allow for concentrating control information (both being relevant for all UEs per cell as well as being relevant for a particular UE) cannot exploit beamforming as a method for extending the coverage area. This problem is illustrated in FIG. 1.

Hence, the full coverage requirement, e.g., regarding the broadcast channel, limits the feasibility and/or the benefits of any beamforming.

The problem to be solved is to overcome the disadvantages set forth above and in particular to provide an efficient mechanism for conveying control information by means of beamforming.

This problem is solved according to the features of the independent claims. Further embodiments result from the depending claims.

In order to overcome this problem, a method for data processing in a wireless communication system, in particular in a cellular system, is suggested,
    wherein an N-to-M control-to-data sectorization is provided to at least one mobile terminal,
        wherein N corresponds to a number of control sectors and M corresponds to a number of data sectors.

The N-to-M control-to-data sectorization may comprise a sectorization utilizing in particular L antennas or L antenna elements. Said N-to-M control-to-data sectorization may further relate to a soft sectorization that could be provided dynamically, temporary or semi-static.

The control sector may convey and/or process control information towards all mobile terminals and/or specific control information for particular mobile terminals. The control information may be provided to a set of N control sectors, e.g., via dynamic or semi-static control beams.

Data information (e.g., user data) per mobile terminal is preferably conveyed in each of the M data sectors.

It is noted that in particular LTE Rel-8 terminals are able to support 1-to-1 control-to-data sectorization even if the system does N-to-M control-to-data sectorization. Thus, the N-to-M control-to-data sectorization (for non-trivial N>1 and non-trivial M>1) can support LTE Rel-8 terminals i.e. terminals which are designed for 1-to-1 control-to-data sectorization.

The wireless communication system may be or be associated with a Long Term Evolution (LTE) system. It may, however, as well be and/or comprise any other (broadband) wireless access technology.

Control information may comprise signaling information and other maintenance information that is conveyed (and or required) by said mobile terminals.

This concept efficiently allows utilizing beamforming for coverage extension purposes. This concept also enables soft sectorization with N=M, i.e. dividing a single cell into multiple spatially separated sectors, flexible fractional frequency reuse schemes, and/or inter-cell interference coordination. When reference is made to beamforming for coverage extension this is regarded an example for N-to-M control-to-data sectorization. The concept is also applicable in combination of several of the aforementioned means.

It is noted that said N-to-M control-to-data sectorization may comprise adaptive beamforming for data information in particular being responsive to feedback from the mobile terminal.

In an embodiment, said N-to-M control-to-data sectorization comprises a set of dynamic beams for conveying control information.

In another embodiment, said N-to-M control-to-data sectorization divides a cellular structure into several virtual cells, each being enabled or arranged to convey control information to mobile terminals.

In a further embodiment, N-to-M control-to-data sectorization is provided via several antenna elements and/or antennas.

In a next embodiment, N-to-M control-to-data sectorization is provided by at least one base station or by at least one eNodeB.

It is also an embodiment that data for a mobile terminal is conveyed via adaptive beamforming in each of the M data sectors.

Hence, data, in particular user data destined for a particular mobile terminal, are conveyed also by means of adaptive beamforming thereby increasing the reach of the base station.

An N-to-M sectorization may thus be established in particular via a number of L antennas or antenna elements, wherein N corresponds to a number of control sectors and M corresponds to a number of data sectors.

Thus, pursuant to another embodiment, several antenna elements and/or several antennas are utilized for N-to-M sectorization.

According to an embodiment, the N-to-M control-to-data sectorization is effective and/or applied in downlink direction and/or in uplink direction.

According to another embodiment, a number of sectors and/or an aggregation associated with said N-to-M control-to-data sectorization is controlled by a network element and/or by an operation and maintenance entity.

In yet another embodiment, N-to-M control-to-data sectorization comprises at least one of the following:
- soft sectorization, in particular comprising dividing a single cell into multiple spatially separated sectors;
- a fractional frequency reuse;
- an inter-cell interference coordination.

The problem stated above is also solved by a device comprising a and/or being associated with a processor unit and/or a hard-wired circuit and/or a logic device that is arranged such that the method as described herein is executable thereon.

According to an embodiment, the device is a communication device, in particular a or being associated with a base station or a mobile terminal.

The problem described above is also solved by a mobile terminal that is arranged to process control information provided as described herein.

The problem stated supra is further solved by a communication system comprising the device as described herein.

BRIEF DESCRIPTION OF THE DRAWINGS

Embodiments of the invention are shown and illustrated in the following figures:

FIG. 4 shows a snap shot of adaptive beamforming of data to be conveyed to the UEs, wherein each beam may supply a particular UE with data destined for such UE.

DETAILED DESCRIPTION OF THE DRAWINGS

The approach provided refers to LTE as an example. It may, however, as well be applicable to other wireless access technologies, in particular to other wireless broadband technologies.

The approach provided in particular comprises a structured N-to-M control-to-data soft sectorization using L antenna elements (or L antennas), thereby enabling (1) to concentrate control information required by all UEs as well as UE-specific information into a set of N control sectors (or N control beams):

(2) to provide data per UE via beamforming per UE in each of the M data sectors;

(3) provide backward compatibility with terminals only supporting 1-to-1 control-to-data sectorization.

As a result, this approach allows for applying beamforming for coverage area extension purposes.

It is an advantage that the coverage of the base station may be extended based on a link budget improvement of $10*\log 10(L)$ without paying penalties on a peak data rate (M=1 ultimately) and on a scheduling freedom implied by hard sectorization.

Exemplary Use Cases:
- LTE coverage extension at moderate site equipment costs, e.g., lower frequencies comprising GSM900, UHF and 700 MHz bands.
- LTE coverage convergence (2.6 GHz) with existing W-CDMA sites (2 GHz): Deploying new base stations can be avoided and existing base stations can be upgraded.

Figure 1:
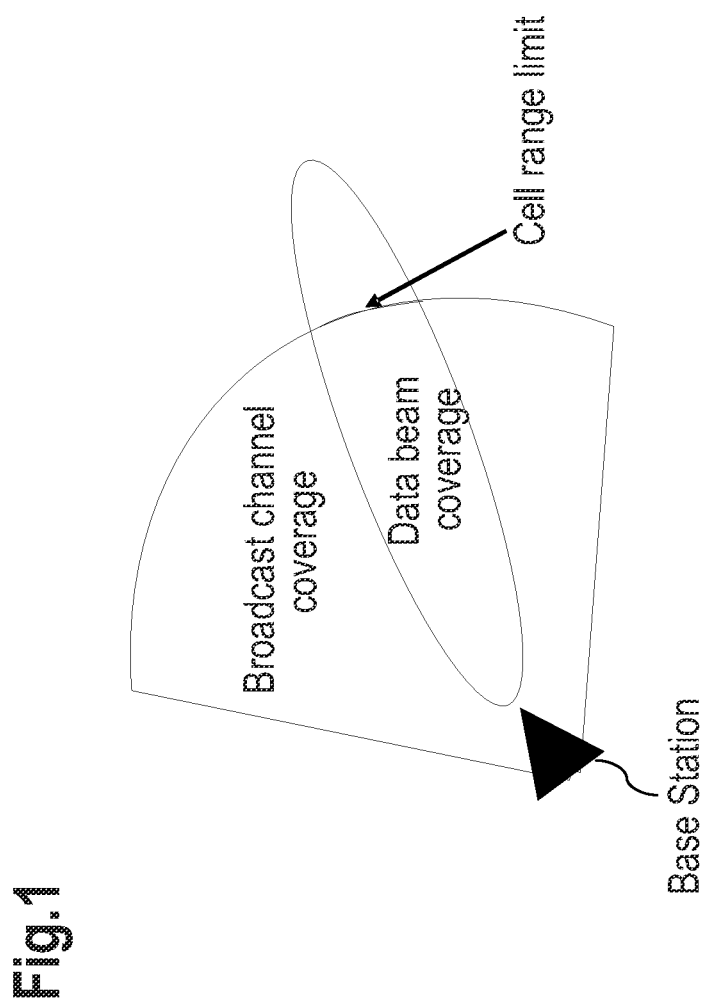
FIG. 1 shows beamforming as a method for extending the coverage area.
Figure 2:
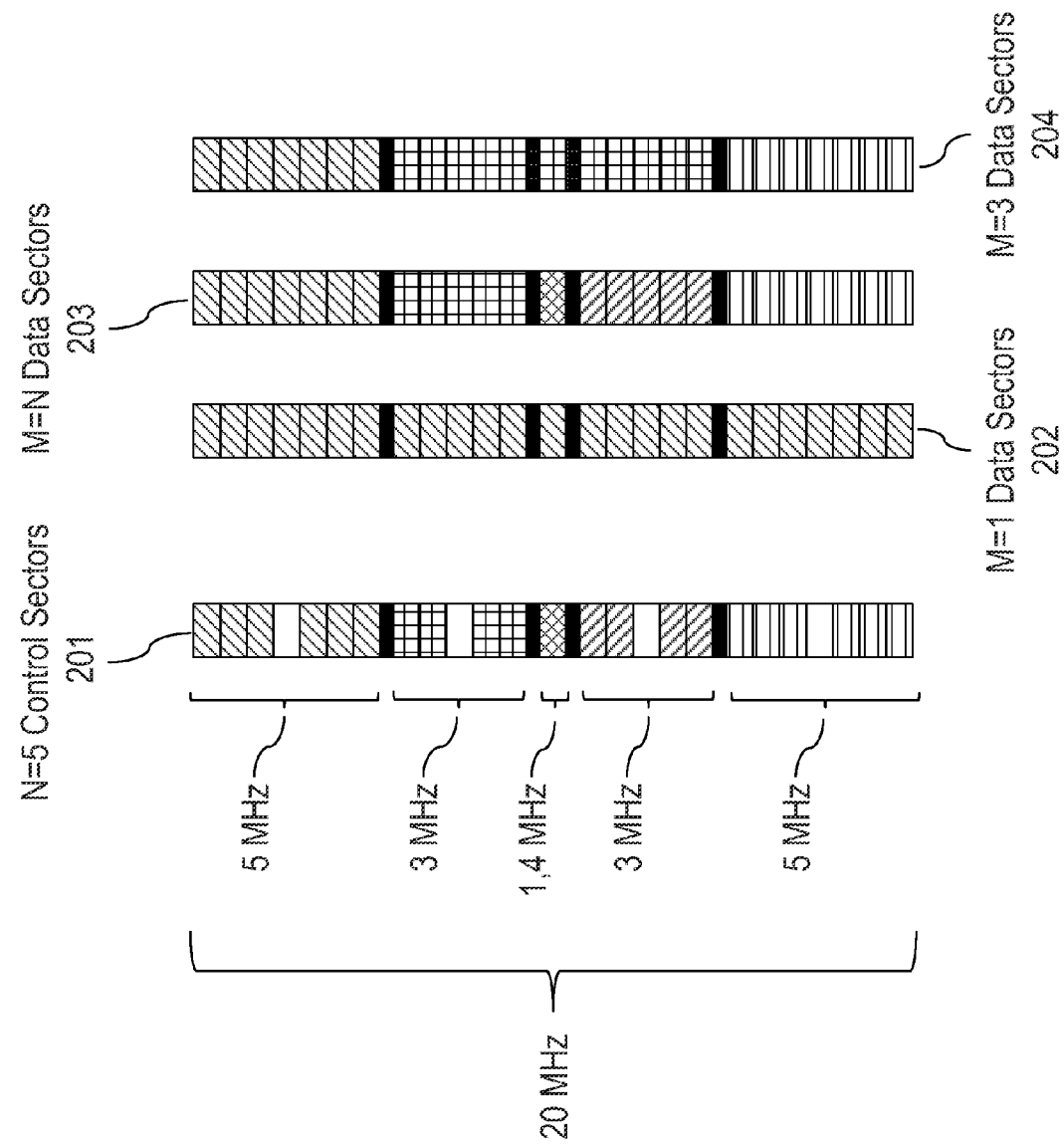
FIG. 2 shows a 20 MHz frequency range comprising N=5 control sectors and several examples for M data sectors with M=1, M=N and M=3, wherein N control (soft) sectors (semi-static control beams) and M (e.g., M=1) data (soft) sectors are suggested in which adaptive beamforming (per UE) applies.

FIG. 2 shows a 20 MHz frequency range comprising N=5 control sectors 201 and several examples for M data sectors 202, 203, 204, i.e. M=1, M=N and M=3.

It is suggested concentrating control information by introducing N control (soft) sectors (semi-static control beams) and M (e.g., M=1) data (soft) sectors in which adaptive beamforming (per UE) applies.

N-to-M Control-to-Data Soft Sectorization

A concentration of control information for a frequency block of, e.g., 20 MHz bandwidth, can be provided using a number of N LTE Rel-8 control channels of smaller bandwidth (e.g., of 10 MHz, 5 MHz, 3 MHz and/or 1.4 MHz) aligned in the frequency dimension as shown on the left side of FIG. 2.

Of course, other bandwidth combinations are possible as well as a different bandwidth range instead of 20 MHz.

Thus, in downlink direction, a physical broadcast channel (PBCH), a primary and a secondary synchronization channel exist N times (i.e. for N control sectors) and for each such sectors 1 to 3 OFDM symbols comprise a physical downlink control channel (PDCCH), a physical control format indicator channel (PCFICH) and a physical hybrid ARQ indicator channel (PHICH).

In uplink direction, this N-times control sectorization can apply or be adapted as well. Hence, the parameter N as well as the aggregation of different bandwidths can be controlled by operation and maintenance (O&M) depending, e.g., on a traffic model.

M=1 Data Sectors

The column 202 of FIG. 2 shows M=1 data sector. Having one data sector means that the frequency resources for a physical downlink shared channel (PDSCH) in downlink direction (and a physical uplink shared channel (PUSCH) in uplink direction) are made available to all N=5 control sectors.

Inter-beam interference coordination on the PDSCH is automatically achieved when not allocating a physical resource block (PRB) for more than one UE while offering access to the (almost) full bandwidth (in this case 17.4 MHz rather than 20 MHz) if required. The allocated PDSCH resources are beam-formed per UE.

For LTE Rel-9 or for LTE-Advanced terminals, a maximum peak data rate for a single UE as well as a scheduling flexibility of the basic single 20 MHz sector can be (almost) maintained, wherein the coverage of an eNodeB (base station) with a 20 MHz spectrum block can be extended by ca. $10*\log 10(L)$ link budget gain.

LTE Rel-8 terminals perceive N=5 different sectors and are preferably handled during scheduling by allocating the PDSCH to be not larger in size than the control sector. Furthermore, an identical carrier center can be used with the control sector. Hence, LTE Rel-8 terminals are supported as well do they benefit from the narrowed (and extended) beam(s) utilized for soft sectorization.

M>1 Data Sectors

In FIG. 2, an example 203 visualizes M=N data sectors resulting in a soft sectorization that is advantageously compliant with LTE Rel-8 terminals. Soft sectorization allows for adaptation to changing traffic needs.

Also, FIG. 2 shows an example 204 comprising M=3 data sectors (with N being larger or equal to M). In this example 204, soft sectorization and beamforming for coverage extension are combined for network optimization.

Figure 3:
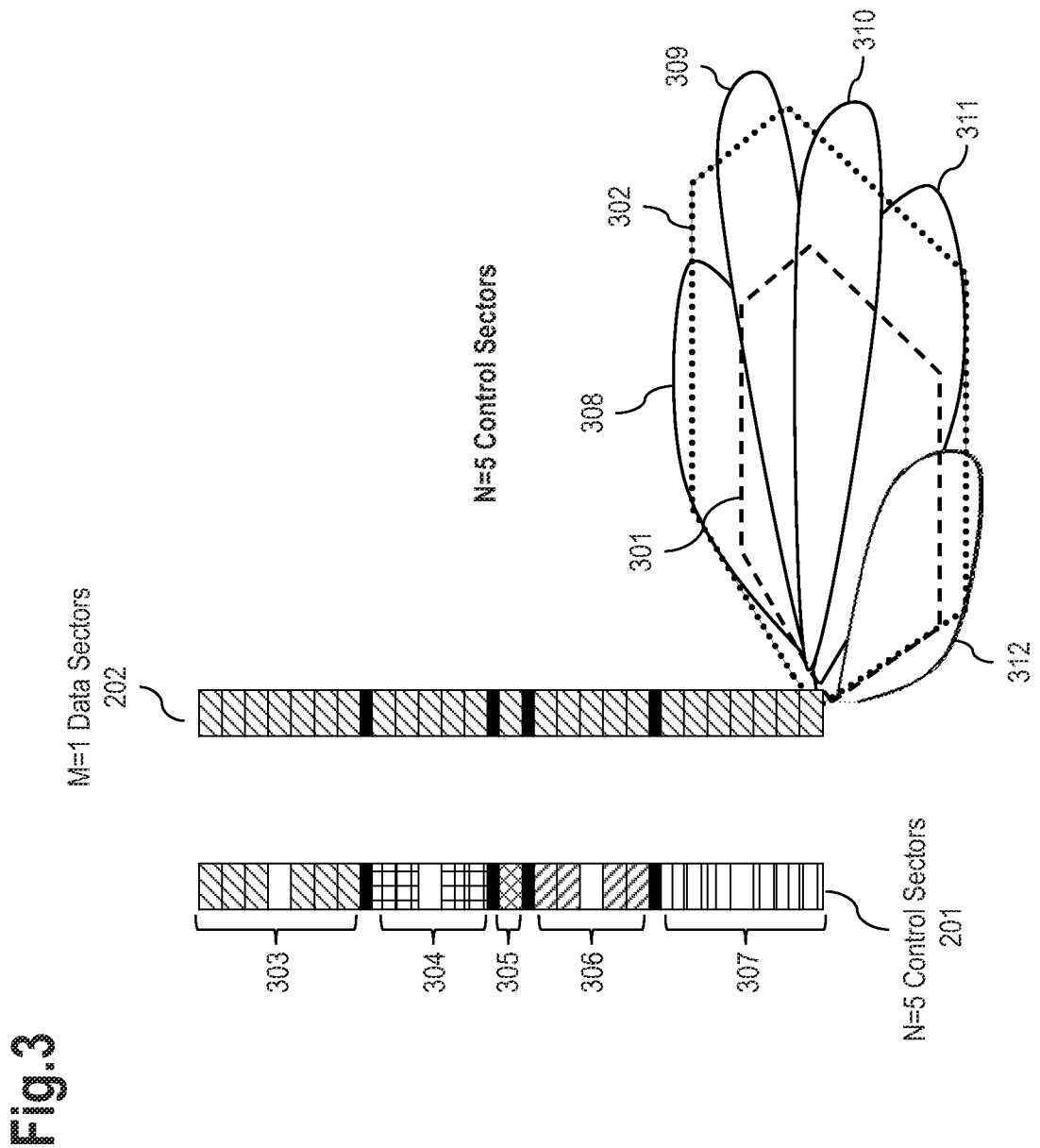
FIG. 3 illustrates an exemplary control sectorization for the configuration of FIG. 2, in particular based on control sectorization with N=5 control sectors and at least 5 antennas or antenna elements.

FIG. 3 illustrates an exemplary control sectorization for the configuration of FIG. 2, in particular based on control sectorization with N=5 control sectors and M=1 data sectors and with at least 5 antennas or antenna elements.

Each frequency ranges 303 to 307 of the N control sectors is mapped to a particular control information beam 308 to 312, e.g. as follows:

| Frequency range | is mapped to Beam |
| --- | --- |
| 303 | 311 |
| 304 | 308 |
| 305 | 312 |
| 306 | 309 |
| 307 | 310 |

Due to the sectorization of the control information, the cell range can be extended from a range 301 (single sector cell range) to a range 302 (N=5 control sectorization).

FIG. 4 shows a snap shot of adaptive beamforming of data applied in the M data sector(s), i.e. different beams 404 to 412, wherein each beam supplies a particular UE with data destined for such UE. Such beamforming allows to extend the range 401 to a range 402 reaching the UEs spaced at a larger distance from the base station or the eNodeB.

For M=1, beamforming per UE allows to obtain at least the link budget gain of the control channels. An additional beamforming gain can be exploited to allow for higher modulation and/or coding schemes.

N-to-M control-to-data soft sectorization may be provided in various ways, which can be categorized by separating signal processing into two phases:
(a) Baseband processing means data stream preparation, block structuring, channel coding and/or interleaving. In LTE this refers to (all) higher layer and layer-1 (L1) steps just prior to the IFFT.
(b) Radio frequency signal generation means generating the radio frequency signal at the antenna connector(s). In LTE this refers to applying the beamforming phase shifts and the IFFT and also comprises the radio-frequency frontend.

Various Methods of Applying N-to-M Control-to-Data Soft Sectorization for LTE

Embodiments or methods to be applicable in particular in the environment of LTE are described hereinafter.
(1) K-fold multi-carrier solution for LTE Rel-9/LTE-Advanced and single-carrier solution for LTE Rel-8:
    The base station may comprise
        a number of M baseband processes for the data sectors;
        a maximum number (max(L,N)) of radio frequency signal generators in order to achieve time and frequency behavior adapted and/or suitable for LTE Rel-8 terminals;
    LTE Rel-9 and/or LTE-Advanced terminals receive a K-fold multi-carrier signal which requires K radio frequency receive chains and baseband processes. K may be the largest possible or supported number of sector assembly per UE. In an N-to-M control-to-data soft sectorization M=1 may result in K=N.
(2) A set of (20 MHz) (I)FFTs (according to and/or based on LTE Rel-8):
    The base station may comprise
        a number of M baseband processes for the data sectors;
        a number of N baseband processes for the control sectors;
        a maximum number (max(L,N)) of radio frequency signal generators all operating on zero-padded continuous (20 MHz) (I)FFT at the base station.
    This allows the LTE Rel-9 and/or LTE-Advanced terminal to work with a single radio frequency receive chain. It also allows for LTE Rel-8 terminal compliance if control sectorization is done in such a way that the control sector carrier center position and LTE Rel-8 data sector carrier center position match. In the example provided herein, the effective overall bandwidth is thus reduced from 20 MHz to 17.4 MHz.
(3) A set of non-continuous (20 MHz) (I)FFTs:
    The base station may comprise
        a number of M baseband processes for the M data sectors;
        a number of N baseband processes for the N control sectors;
        a maximum number (max(L,N)) of radio frequency signal generators all operating on zero-padded Non-Continuous (20 MHz) (I)FFT at the base station.
    The LTE Rel-9 and/or LTE-Advanced terminal will require a single radio frequency receiver and base band chain. The non-continuous (I)FFT and radio frequency signal is generated and optimized in such a way that LTE Rel-8 terminals are able to receive and decode their (control and data) sector being a continuous chunk out of the non-continuous (I)FFT. In this case, a reduction of the effective overall bandwidth is not necessary. The exemplary 20 MHz range may be 4-to-1 sectorized with four 5 MHz control sectors and one non-continuous 20 MHz (I)FFT data sector.

LIST OF ABBREVIATIONS

3GPP 3rd Generation Partnership Project
ARQ Automatic Repeat Request
CDMA Code Division Multiple Access
DSL Digital Subscriber Line
eNodeB evolved NodeB (e.g., base station)
FFT Fast Fourier Transform
FFT Fast Fourier Transformation
HSPA High Speed Packet Access
IFFT Inverse FFT
LTE Long Term Evolution of 3GPP standard
PBCH Physical Broadcast Channel
PCFICH Physical Control Format Indicator Channel
PDCCH Physical Downlink Control Channel
PDSCH Physical Downlink Shared Channel
PHICH Physical Hybrid ARQ Indicator Channel
PMCH Physical Multicast Channel
PRB Physical Resource Block
PUCCH Physical Uplink Control Channel
PUSCH Physical Uplink Shared Channel
Rel-8 Release 8
SNIR Signal-to-Noise-and-Interference Ratio
SRS Sounding Reference Signal
UE User Equipment (e.g., mobile terminal/station/device)
W-CDMA Wideband CDMA
WiMAX Worldwide Interoperability for Microwave Access

What is claimed is:

1. A method comprising:
    configuring a set of M data sectors at the site of an access node of a wireless communication system, wherein M≥1 (M is greater than or equal to 1);
    conveying data to one or more mobile terminals via beamforming from the access node to the M data sectors;
    subdividing resources available on the air interface at the site of the access node into the M data sectors; and
    configuring dynamically a set of N control sectors, wherein N>1 (N is greater than 1), and wherein the control sectors are arranged to convey control information of a cell of the wireless communication system to mobile terminals for controlling data transmissions between the access node and mobile terminals on the resources of the M data sectors.

2. The method according to claim 1, wherein adaptive beamforming is employed in the control sectors for transmitting the control signals.

3. The method according to claim 1, wherein the N control sectors and the M data sectors divide a cellular structure into several virtual cells, each being arranged to convey control information to mobile terminals.

4. The method according to claim 1, wherein the N control sectors and the M data sectors are provided via several antennas, antenna elements or both antennas and antenna elements.

5. The method according to claim 1, wherein the N control sectors and the M data sectors are provided by at least one base station or by at least one eNodeB.

6. The method according to claim 1, wherein data for a mobile terminal is conveyed via adaptive beamforming to each of the M data sectors.

7. The method according claim 1, wherein several antenna elements and/or several antennas are utilized for data transmission in the N control sectors and the M data sectors.

8. The method according to claim 1, wherein the N control sectors and the M data sectors are at least one of
    effective or
    applied in at least one of a downlink direction or an uplink direction.

9. The method according to claim 1, wherein a number of sectors and/or an aggregation of resources on the air interface associated with the N control sectors or the M data sectors is controlled by a network element and/or by an operation and maintenance entity.

10. The method according to claim 1, further comprising at least one of:
    dividing a single cell into multiple spatially separated sectors;
    a fractional frequency reuse;
    an inter-cell interference coordination.

11. An apparatus comprising at least one processor and at least one memory including computer program code, wherein the at least one memory and the computer code are configured, with the at least one processor, to cause the apparatus to at least perform the following:
    configuring a set of M data sectors at the site of an access node of a wireless communication system, wherein M≥1 (M is greater than or equal to 1);
    conveying data to one or more mobile terminals via beamforming from the access node to the M data sectors;
    subdividing resources available on the air interface at the site of the access node into the M data sectors; and
    configuring dynamically a set of N control sectors, wherein N>1 (N is greater than 1), and wherein the control sectors are arranged to convey control information of a cell of the wireless communication system to mobile terminals for controlling data transmissions between the access node and mobile terminals on the resources of the M data sectors.

12. The apparatus according to claim 11, wherein said device is a communication device, in particular a base station or a mobile terminal or being associated with a base station or a mobile terminal.

13. A mobile terminal arranged to process control information provided according to claim 1.

14. A communication system comprising the apparatus according to claim 11.

15. The method according to claim 1, wherein the control signals of at least two of the control sectors are arranged for conveying control information related to resources the same as the M data sectors.

16. The method according to claim 1, wherein the control sectors and the data sectors are adapted according to data traffic needs.

17. The method according to claim 1, wherein the signaling of information in one or more of the control sectors is compliant with requirements for controlling a terminal according to Release 8 of the 3GPP Long Term Evolution standard.

18. A computer program product embodied on a non-transitory computer-readable medium, in which a computer program is stored which, when being executed by a computer, the computer program product is configured to provide instructions to control or carry out:
    configuring a set of M data sectors at the site of an access node of a wireless communication system, wherein M≥1 (M is greater than or equal to 1);
    conveying data to one or more mobile terminals via beamforming from the access node to the M data sectors;
    subdividing resources available on the air interface at the site of the access node into the M data sectors; and
    configuring dynamically a set of N control sectors, wherein N>1 (N is greater than 1), and wherein the control sectors are arranged to convey control information of a cell of the wireless communication system to mobile terminals for controlling data transmissions between the access node and mobile terminals on the resources of the M data sectors.

* * * * *